US012305672B1

(12) United States Patent
Pelini

(10) Patent No.: US 12,305,672 B1
(45) Date of Patent: May 20, 2025

(54) HYDRAULIC CYLINDER BOTTOM END CAP

(71) Applicant: Mark Pelini, Valrico, FL (US)

(72) Inventor: Mark Pelini, Valrico, FL (US)

( * ) Notice: Subject to any disclaimer, the term of this patent is extended or adjusted under 35 U.S.C. 154(b) by 0 days.

(21) Appl. No.: 18/661,361

(22) Filed: May 10, 2024

Related U.S. Application Data

(63) Continuation-in-part of application No. 18/660,988, filed on May 10, 2024.

(51) Int. Cl.
*F15B 15/14* (2006.01)

(52) U.S. Cl.
CPC ...... *F15B 15/1433* (2013.01); *F15B 15/1438* (2013.01); *F15B 15/1442* (2013.01)

(58) Field of Classification Search
CPC .............. F15B 15/1433; F15B 15/1438; F15B 15/1442
See application file for complete search history.

(56) References Cited

U.S. PATENT DOCUMENTS 2,533,531 A * 12/1950 Stephens .................. F16J 10/02 92/252
2,865,693 A * 12/1958 Barnhart .................. F16J 10/02 92/169.1
3,474,710 A * 10/1969 Stryker ............... F15B 15/1438 29/888.06
3,494,652 A * 2/1970 Langland ................. F16J 10/02 92/128
3,643,551 A * 2/1972 Berg ................... F15B 15/1438 92/128
4,182,579 A * 1/1980 McCormick ............ F16B 21/18 411/517
4,207,807 A * 6/1980 Takata ................ F15B 15/1438 92/170.1
4,924,757 A * 5/1990 Keene ................... F15B 15/225 403/326
5,806,406 A * 9/1998 Pettersson ........... F15B 15/1433 92/128
8,807,016 B2 * 8/2014 Beumer .............. F15B 15/1438 92/169.1
9,989,075 B2 * 6/2018 Bueter ................ F15B 15/1438

FOREIGN PATENT DOCUMENTS

DE 102004008768 * 9/2005 .......... F15B 15/1438

* cited by examiner

*Primary Examiner* — Dustin T Nguyen
(74) *Attorney, Agent, or Firm* — Edward P Dutkiewicz

(57) ABSTRACT

The bottom end cap has an outer surface having a first upper O ring groove and a second lower O ring groove. The outer surface has a pressure line aperture therein. The outer surface has a snap ring groove and a third sweep O ring groove. The bottom end cap has a lower portion and an upper portion. The upper portion has a recess therein and the lower portion having a slot therein. The lower portion has a pin hole being located orthogonal to the slot.

7 Claims, 9 Drawing Sheets

HYDRAULIC CYLINDER BOTTOM END CAP

BACKGROUND OF THE INVENTION

Rule 1.78 (F) (1) Disclosure

The Applicant has submitted a related pending or patented non-provisional application within two months of the filing date of this present application. The invention is made by a single inventor, so there are no other inventors to be disclosed. This application is not under assignment to any other person or entity at this time.

There are cross referenced or related applications which are direct to, or related to, the present application.

There is no research of development of this application which is federally sponsored.

This application is a continuation in part application of a currently existing and pending utility patent application, filed on May 10, 2024, bearing Ser. No. 18/660,988. The Applicant claims the priority of the above referenced utility patent application.

FIELD OF THE INVENTION

The present invention relates to a hydraulic cylinder bottom end cap and more particularly pertains to a novel way of sealing off the end of a hydraulic cylinder.

DESCRIPTION OF THE PRIOR ART

The use of hydraulic cylinder bottom end caps is known in the prior art. More specifically, a hydraulic cylinder bottom end cap, previously devised and utilized for the purpose of sealing off the end of a hydraulic cylinder are known to consist basically of familiar, expected, and obvious structural configurations, notwithstanding the number of designs encompassed by the prior art, which has been developed for the fulfillment of countless objectives and requirements.

While the prior art devices fulfill their respective, particular objectives and requirements, the prior art does not describe hydraulic cylinder bottom end cap that allows for the use of a snap ring to couple the bottom end cap to an existing hydraulic cylinder.

In this respect, the hydraulic cylinder bottom end cap according to the present invention substantially departs from the conventional concepts and designs of the prior art, and in doing so provides an apparatus primarily developed for the purpose of providing a top end cap for a hydraulic cylinder.

Therefore, it can be appreciated that there exists a continuing need for a new and improved hydraulic cylinder bottom end cap which can be used for sealing off a hydraulic cylinder using a snap ring and some O rings. In this regard, the present invention substantially fulfills this need.

SUMMARY OF THE INVENTION

In view of the foregoing disadvantages inherent in the known types of hydraulic cylinder bottom end cap now present in the prior art, the present invention provides an improved hydraulic cylinder bottom end cap. As such, the general purpose of the present invention, which will be described subsequently in greater detail, is to provide a new and improved hydraulic cylinder bottom end cap which has all the advantages of the prior art and none of the disadvantages.

In describing this invention, the word “coupled” may used. By “coupled” is meant that the article or structure referred to is joined, either directly, or indirectly, to another article or structure. By “indirectly joined” is meant that there may be an intervening article or structure imposed between the two articles which are “coupled”. “Directly joined” means that the two articles or structures are in contact with one another or are essentially continuous with one another.

In describing aspects of the invention, the word “generally” may be used. The term, “generally” when used to describe a configuration means that the configuration includes those aspects which are within normal manufacturing parameters of acceptance. By way of example, the term “generally round” may be used. This should be interpreted to mean that the configuration may be perfectly round, but may also have a radius which is not exact, but is within the manufacturing parameters. For example, a basketball may be generally round, but not be perfectly round.

By adjacent to a structure is meant that the location is near the identified structure.

To attain this, the present invention essentially comprises a hydraulic cylinder bottom end cap comprising several components, in combination.

There is an outer surface. The outer surface of the hydraulic cylinder bottom end cap has a round configuration having a first external diameter. The outer surface has an upper portion with an upper extent and a lower portion with a lower extent, with a length between the upper extent and the lower extent of the outer surface.

The upper extent of the outer surface has a flat ring configuration. The lower extent of the outer surface has a flat circular ring configuration with an outermost edge. The outermost edge of the lower extent of the outer surface of the bottom end cap has a bevel therein.

The upper portion of the outer surface of the bottom end cap has a first lower O ring groove and a second upper O ring groove. The first upper O ring groove of the upper portion of the bottom end cap and the second lower O ring groove of the upper portion of the bottom end cap each have a first width and a first depth.

The upper portion outer surface has a threaded pressure line aperture therein. The threaded pressure line is located between the first upper O ring groove and the second lower O ring groove.

The lower portion of the outer surface of the hydraulic cylinder bottom end cap has a snap ring groove therein. The snap ring groove of the lower portion of the outer surface of the bottom end cap has a second depth and a second width. The second depth is greater that the first depth and the second width is less than the first width.

The lower portion of the outer surface of the bottom end cap has a third sweep O ring groove. The sweep O ring groove has a third width and a third depth. The third width of the sweep O ring groove is less than the first upper O ring groove and the second lower O ring groove. The third width of the sweep O ring groove is greater than the second width of the snap ring groove. The third depth of the sweep O ring groove is less than the first depth of the first upper O ring groove and the second lower O ring groove.

The snap ring groove of the outer surface is located between the second lower O ring groove and the third sweep O ring groove.

The lower portion of the outer surface of the bottom end cap has a solid round tubular configuration with a slot there in. The lower portion of the outer surface of the bottom end cap has pin hole there through, with the pin hole being orthogonal to the slot.

There is an inner surface. The inner surface of the bottom end cap has a lower extent and an upper extent. The inner surface of the bottom end cap has the threaded pressure line aperture there through.

The inner surface lower extent is closed having a semi conically shape with a step.

The inner surface upper extent of the upper portion has a second step with an outward bevel therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hydraulic cylinder bottom end cap which has all of the advantages of the prior art hydraulic cylinder bottom end cap and none of the disadvantages.

It is another object of the present invention to provide a new and improved hydraulic cylinder bottom end cap which may be easily and efficiently manufactured and marketed.

It is further object of the present invention to provide a new and improved hydraulic cylinder bottom end cap which is of durable and reliable constructions.

An even further object of the present invention is to provide a new and improved hydraulic cylinder bottom end cap which is susceptible of a low cost of manufacture with regard to both materials and labor, and which accordingly is then susceptible of low prices of sale to the consuming public, thereby making such hydraulic cylinder bottom end cap economically available to the buying public.

Even still another object of the present invention is to provide a hydraulic cylinder bottom end cap for allowing a hydraulic cylinder bottom end cap to be coupled to an existing hydraulic cylinder using a snap ring and O rings.

Lastly, it is an object of the present invention to provide a new and improved The bottom end cap has an outer surface having a first upper O ring groove and a second lower O ring groove. The outer surface has a pressure line aperture therein. The outer surface has a snap ring groove and a third sweep O ring groove. The bottom end cap has a lower portion and an upper portion. The upper portion has a recess therein and the lower portion having a slot therein. The lower portion has a pin hole being located orthogonal to the slot.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
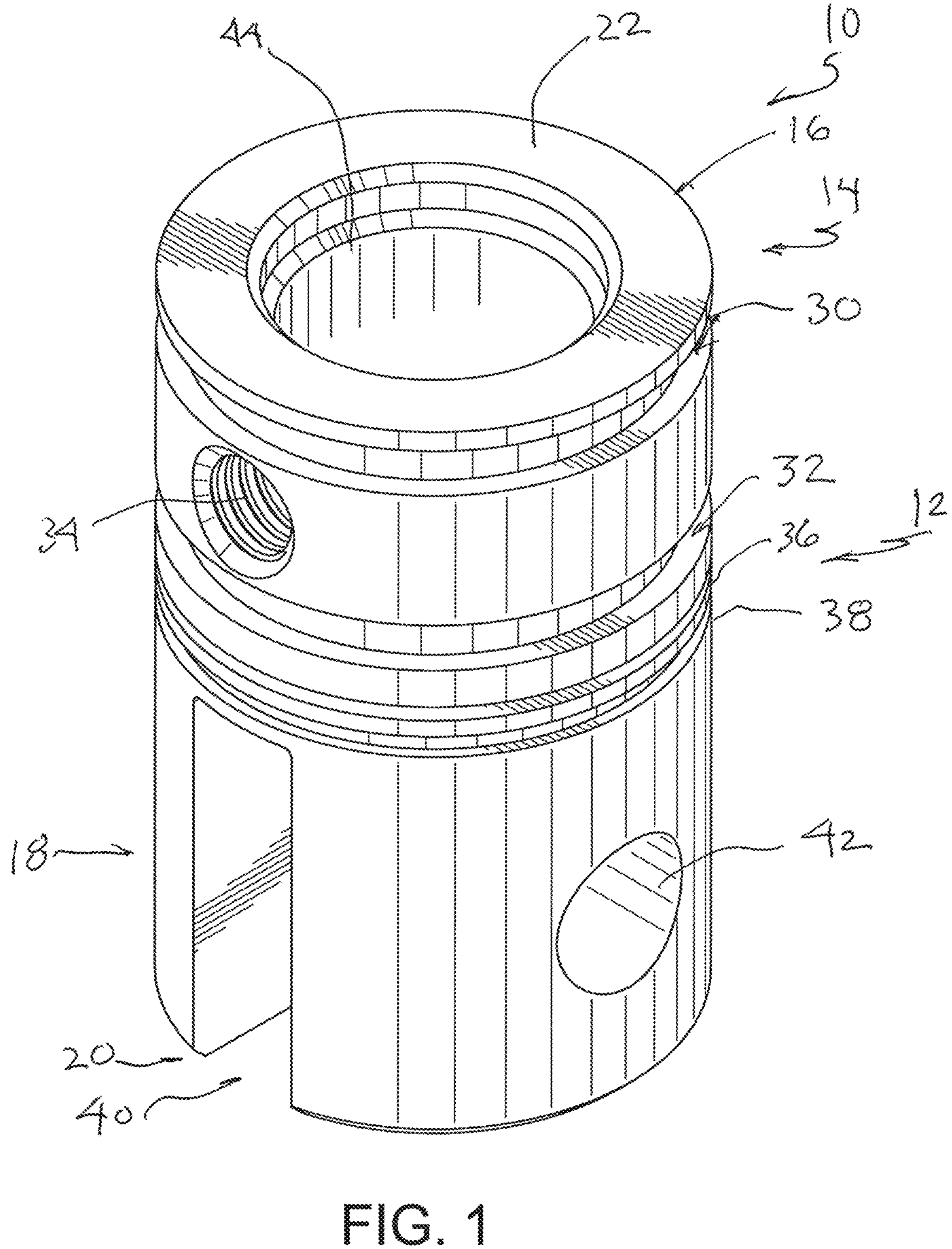
FIG. 1 is top right perspective view of the hydraulic cylinder bottom end cap.
Figure 2:
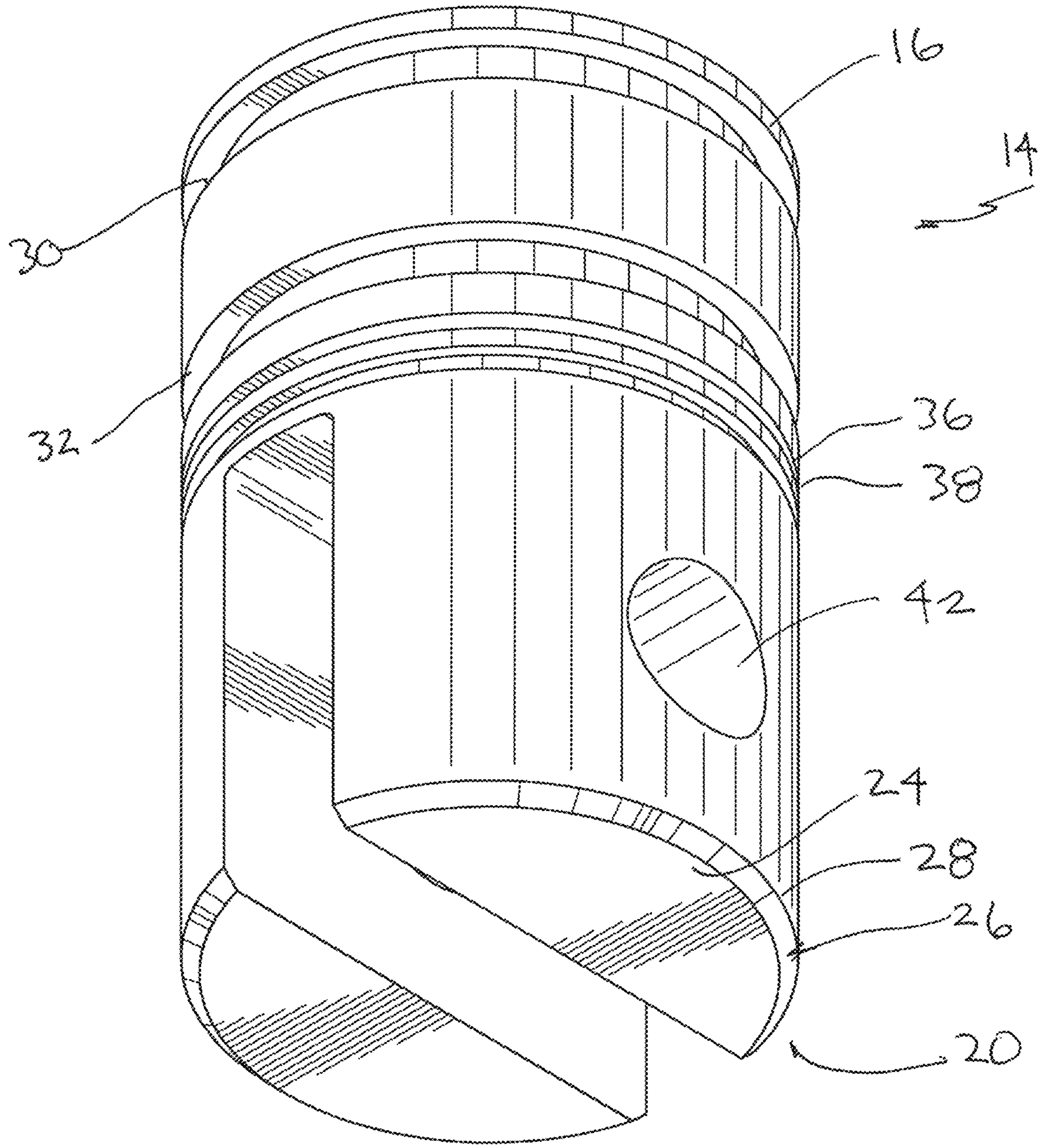
FIG. 2 is bottom left perspective view thereof.
Figure 3:
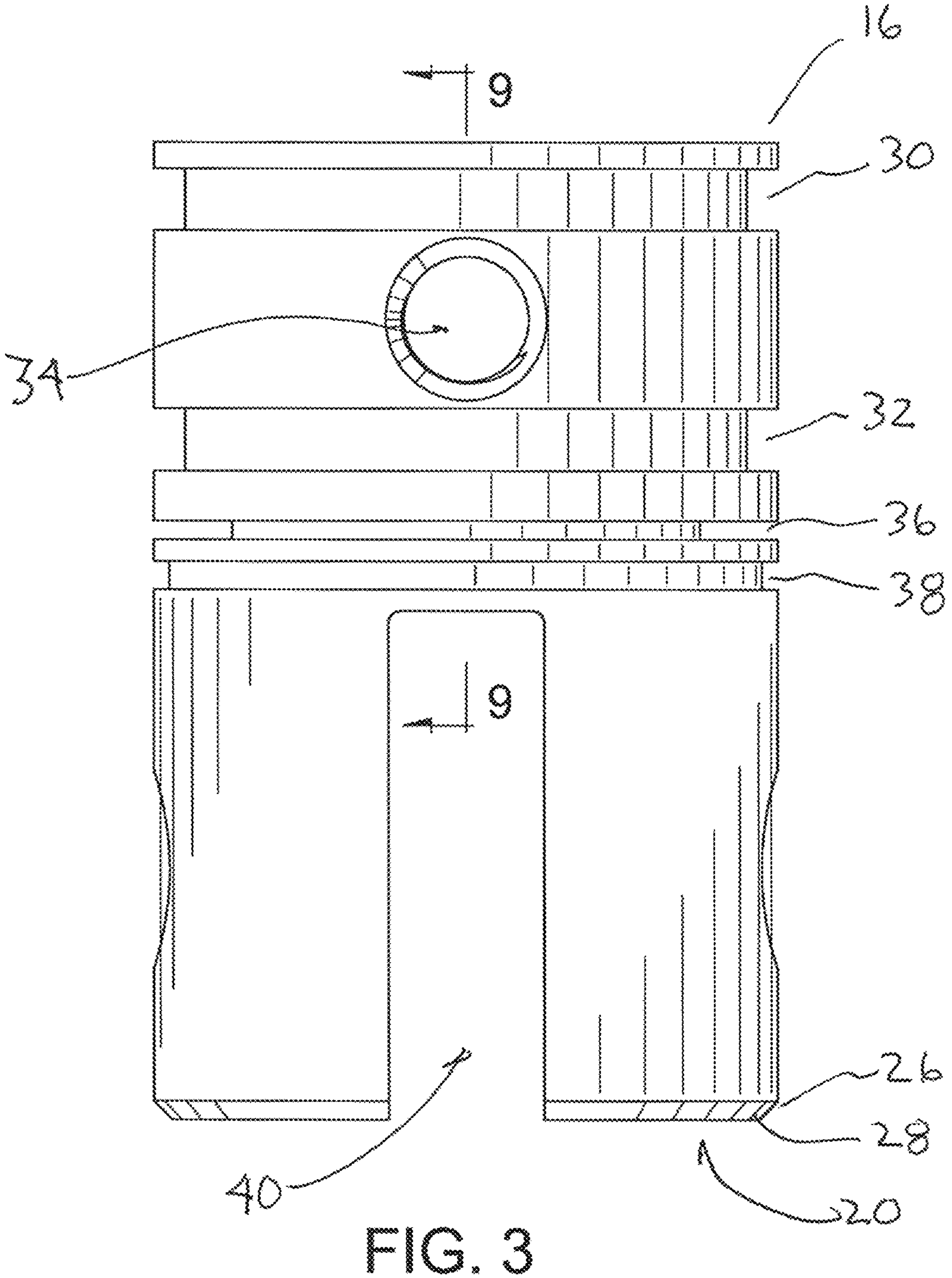
FIG. 3 is front elevational view thereof.

With reference now to the drawings, and in particular to FIG. 1 thereof, the preferred embodiment of the new and improved hydraulic cylinder bottom end cap embodying the principles and concepts of the present invention and generally designated by the reference numeral 10 will be described.

The present invention, the hydraulic cylinder bottom end cap 10 is comprised of a plurality of components. Such components in their broadest context include a pair of O rings, a sweep O ring, a snap ring and a threaded aperture. Such components are individually configured and correlated with respect to each other so as to attain the desired objective.

A hydraulic cylinder bottom end cap 10 comprising several components, in combination.

There is an outer surface 12. The outer surface of the hydraulic cylinder bottom end cap has a round configuration having a first external diameter. The outer surface has an upper portion 14 with an upper extent 16 and a lower portion 18 with a lower extent 20, with a length between the upper extent and the lower extent of the outer surface.

The upper extent of the outer surface has a first flat ring 22 configuration. The lower extent of the outer surface has a second flat circular ring 24 configuration with an outermost edge 26. The outermost edge of the lower extent of the outer surface of the bottom end cap has a bevel 28 therein.

The upper portion of the outer surface of the bottom end cap has a first upper O ring groove 30 and a second lower O ring groove 32. The first upper O ring groove of the upper portion of the bottom end cap and the second lower O ring groove of the upper portion of the bottom end cap each have a first width and a first depth.

The upper portion outer surface has a threaded pressure line aperture 34 therein. The threaded pressure line is located between the first upper O ring groove and the second lower O ring groove.

The lower portion of the outer surface of the hydraulic cylinder bottom end cap has a snap ring groove 36 therein. The snap ring groove of the lower portion of the outer surface of the bottom end cap has a second depth and a second width. The second depth is greater that the first depth and the second width is less than the first width.

The lower portion of the outer surface of the bottom end cap has a third sweep O ring groove 38. The sweep O ring groove has a third width and a third depth. The third width of the sweep O ring groove is less than the first upper O ring groove and the second lower O ring groove. The third width of the sweep O ring groove is greater than the second width of the snap ring groove. The third depth of the sweep O ring groove is less than the first depth of the first upper O ring groove and the second lower O ring groove.

The snap ring groove of the outer surface is located between the second lower O ring groove and the third sweep O ring groove.

The lower portion of the outer surface of the bottom end cap has a solid round tubular configuration with a slot 40 there in. The lower portion of the outer surface of the bottom end cap has pin hole 42 there through, with the pin hole being orthogonal to the slot.

There is an inner surface 44. The inner surface of the bottom end cap has a lower extent 46 and an upper extent 48. The inner surface of the bottom end cap has the threaded pressure line aperture there through.

The inner surface lower extent is closed having a semi conically shape 50 with a step 52.

The inner surface upper extent of the upper portion has a second step 54 with an outward bevel 56 therein.

The lower end cap is inserted into an existing hydraulic cylinder 58, which has an upper end 60 and a lower end 62. There is an interior surface 64 which has an upper end snap ring groove 66 and a lower end snap ring groove 68. The hydraulic cylinder has an exterior surface 70, with a wall thickness between the interior surface and the exterior surface. There is an upper aperture 72 through the upper cylinder wall. There is a lower aperture 74 through the lower cylinder wall.

Figure 4:
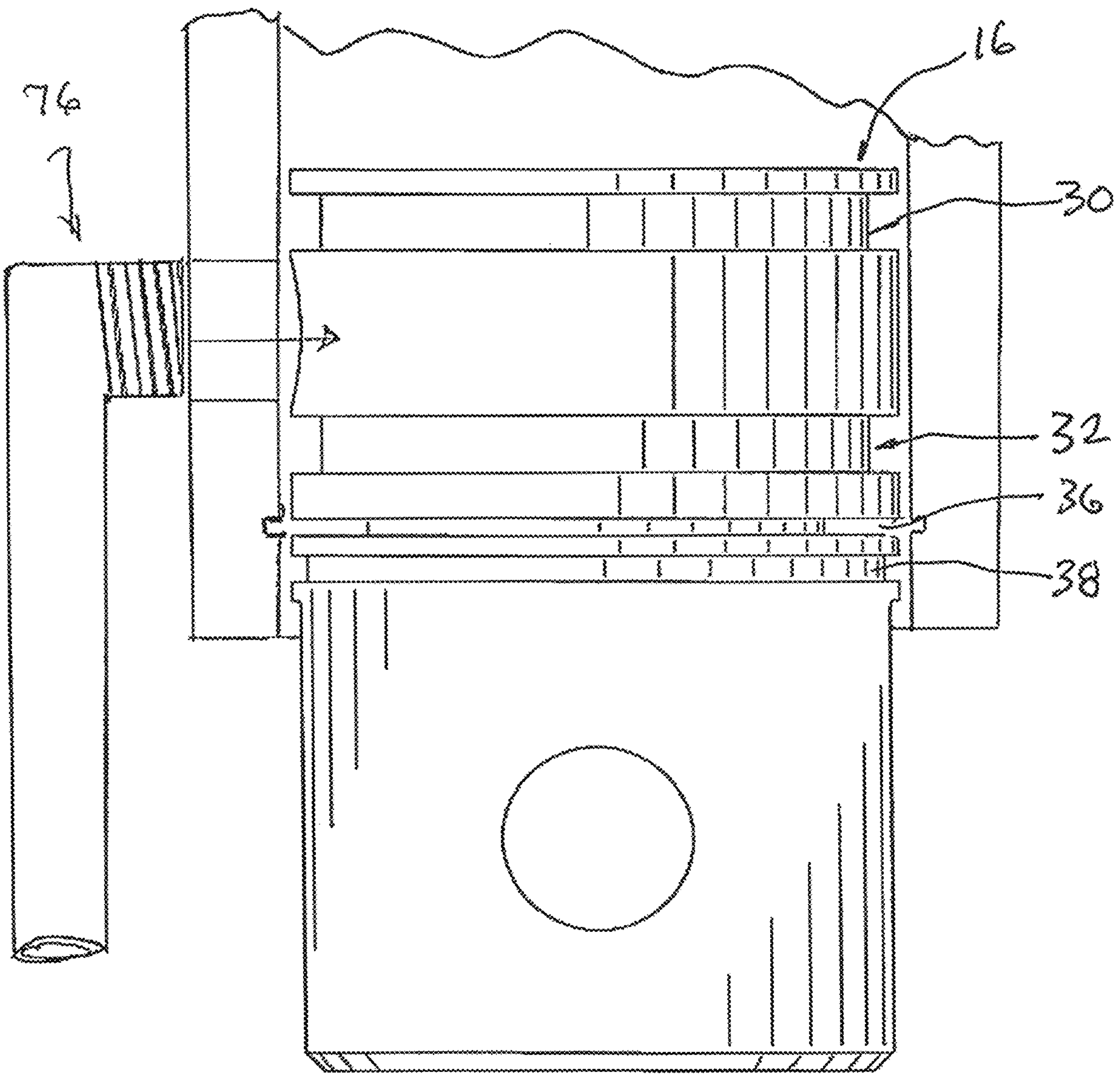
FIG. 4 is right side elevational view with an existing hydraulic cylinder and fluid inflow pipe shown in broken line.
Figure 5:
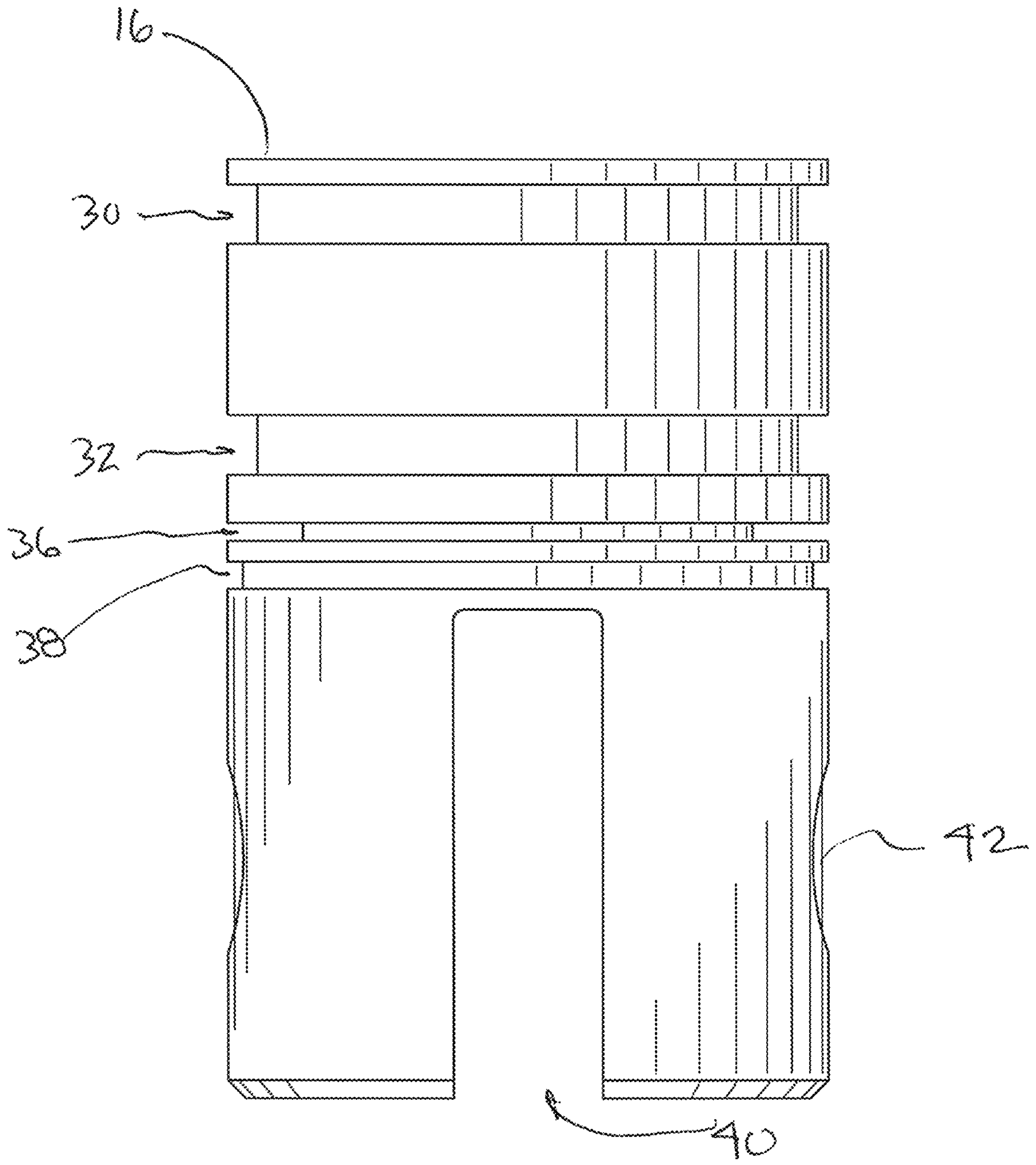
FIG. 5 is another front elevational view thereof.
Figure 6:
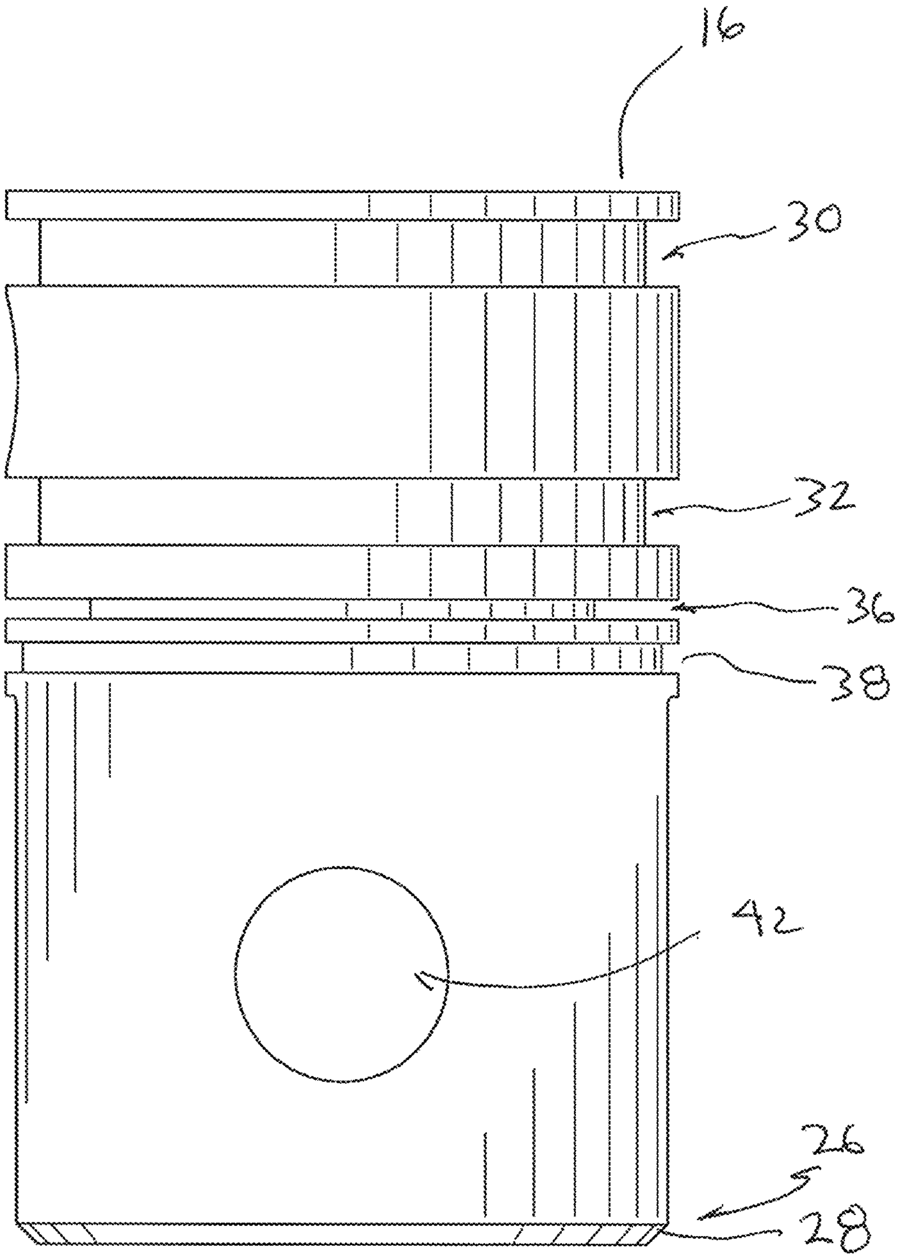
FIG. 6 is a rear elevational view thereof.
Figure 7:
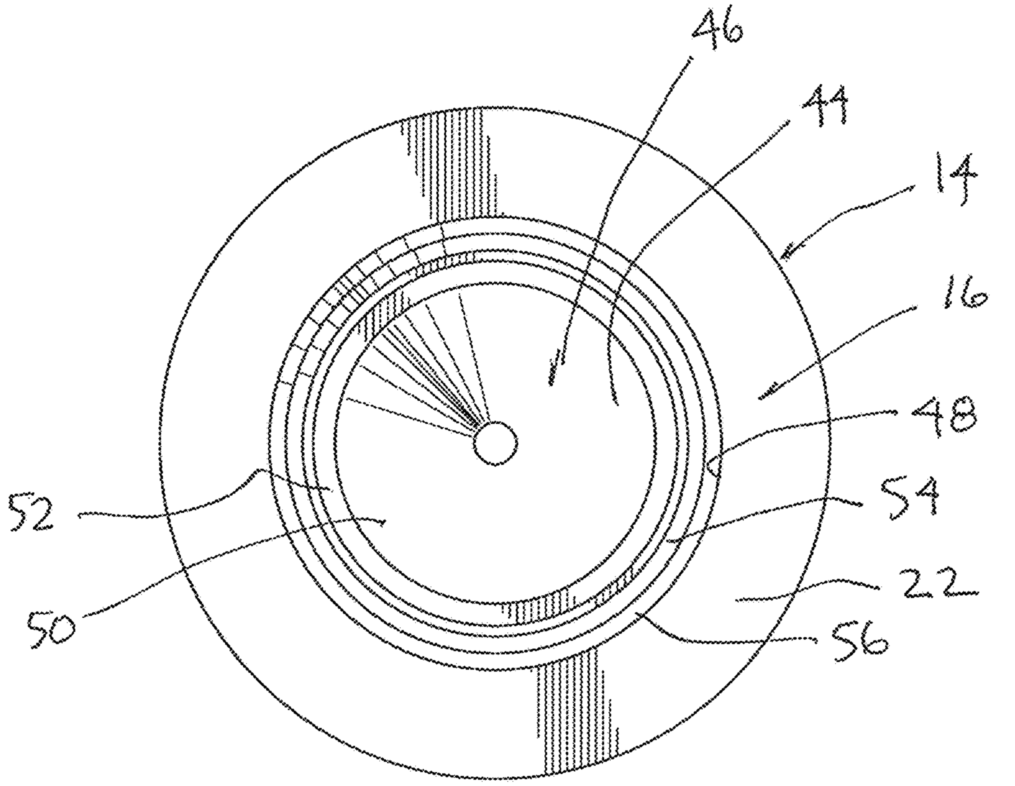
FIG. 7 is a top plan view thereof.
Figure 8:
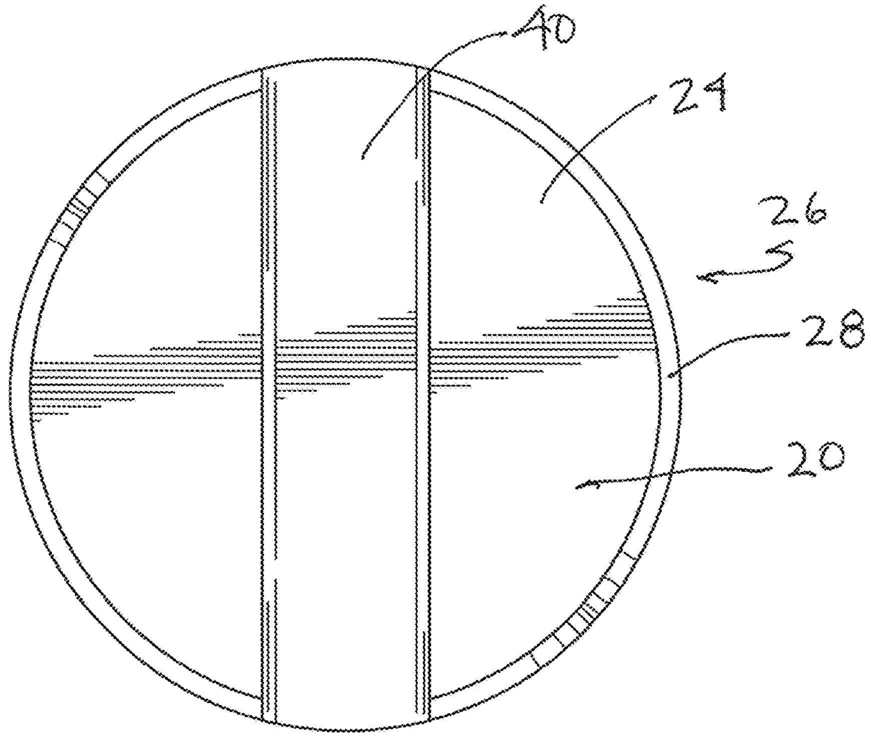
FIG. 8 is a bottom plan view thereof.
Figure 9:
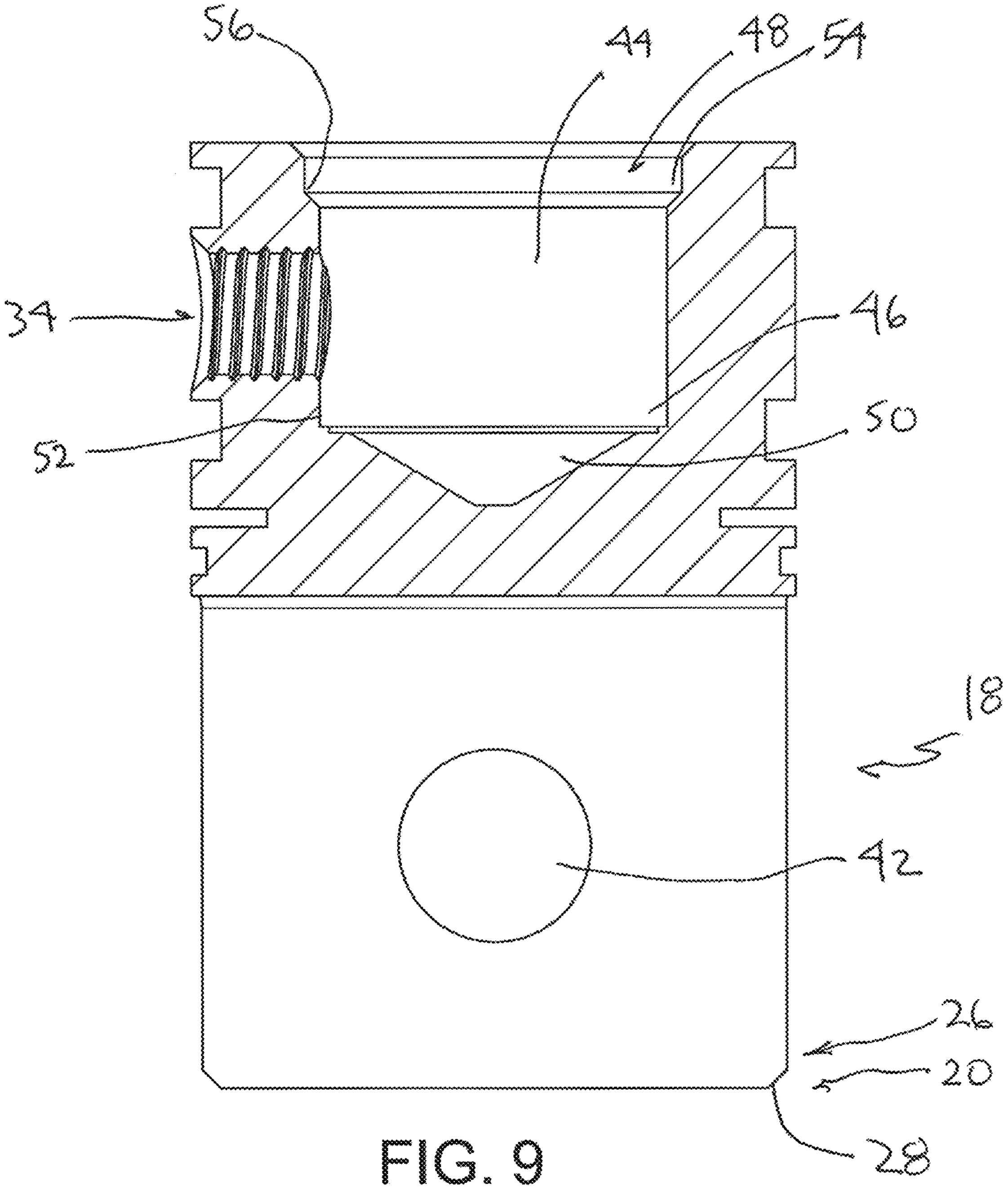
FIG. 9 is a view taken along line 9-9 of FIG. 3.
Figure 10:
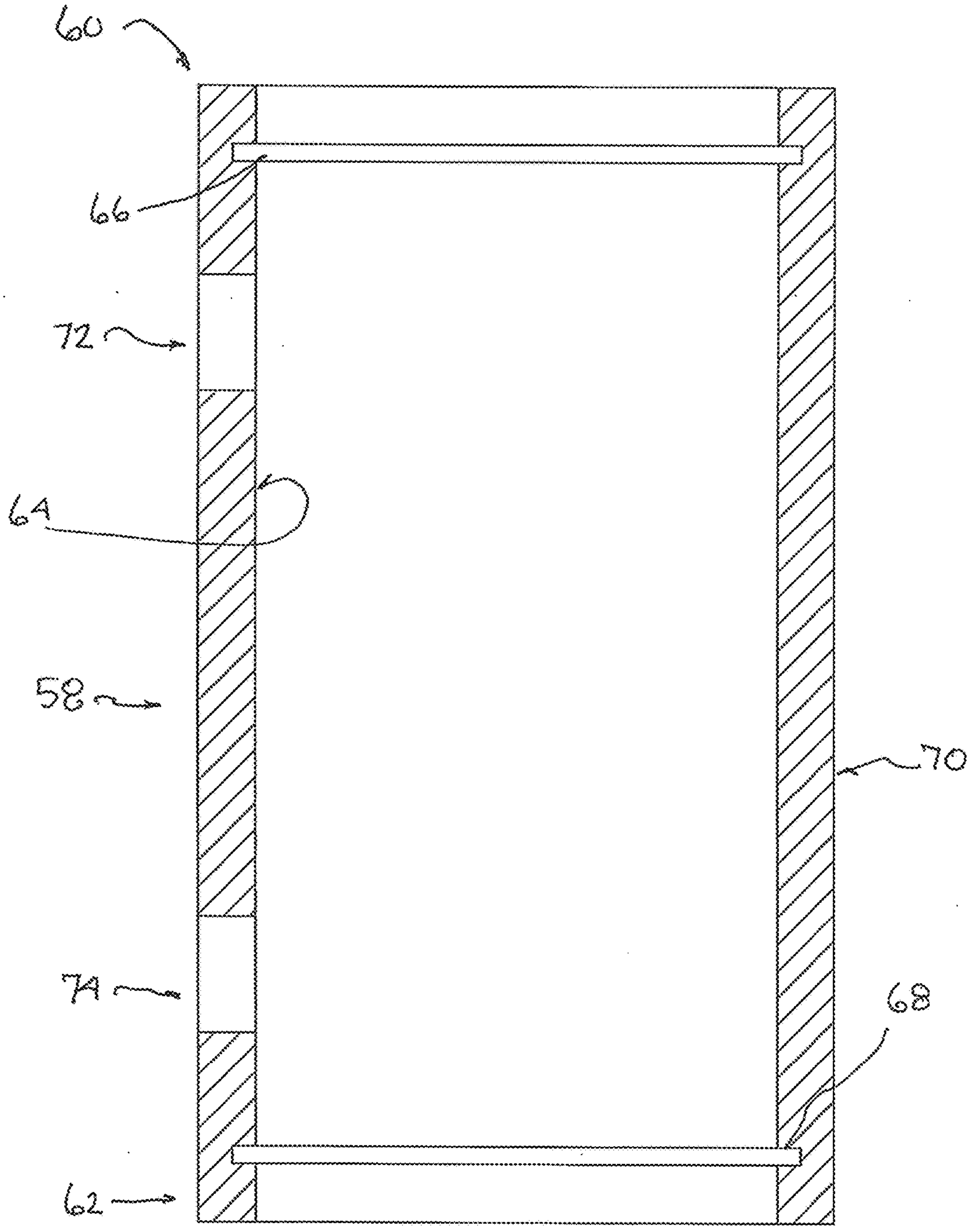
FIG. 10 is a cross sectional view of a hydraulic cylinder.

When assembled, a pressure fitting passes through the cylinder wall and threads into the lower end cap. The Applicant has provided, in FIG. 4, the existing hydraulic cylinder has the lower end with the snap ring groove therein. The hydraulic cylinder has the smooth interior wall with the snap ring groove at the lower end of the cylinder and the snap ring groove at the upper end of the cylinder.

There is also the smooth lower pressure fitting aperture through the lower wall of the hydraulic cylinder, for coupling an inflow fitting 76 thereto, thereby allowing a pressurized upward movement and a pressurized downward movement of a hydraulic cylinder ram and piston, which are not shown in the drawings, but well known in the art.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hydraulic cylinder bottom end cap comprising:

an outer surface having a round configuration with the round configuration having a first external diameter, the outer surface having an upper portion with an upper extent and a lower portion with a lower extent with a length between the upper extent and the lower extent, the upper portion of the outer surface of the bottom end cap having a first upper O ring groove and a second lower O ring groove, the upper portion outer surface having a pressure line aperture therein, the lower portion of the outer surface of the hydraulic cylinder bottom end cap having a snap ring groove, the lower portion of the outer surface of the bottom end cap having a third sweep O ring groove; and an inner surface of the bottom end cap having a lower extent and an upper extent, the inner surface forming a round recess with a closed lower extent in the upper portion of the bottom end cap, the inner surface of the bottom end cap having the pressure line aperture there through.

2. The hydraulic cylinder bottom end cap as described in claim 1, with the bottom end cap further comprising the pressure line aperture of the lower portion outer surface of the end cap having a thread.

3. The hydraulic cylinder bottom end cap as described in claim 2, with the bottom end cap further comprising:

the upper extent of the outer surface having a flat configuration;

the first upper O ring groove of the upper portion of the bottom end cap and the second lower O ring groove of the upper portion of the bottom end cap each having a first width and a first depth;

the snap ring groove of the upper portion of the outer surface of the bottom end cap having a second depth and a second width, the second depth being greater that the first depth and the second width being less than the first width;

the lower portion of the outer surface of the bottom end cap having a solid round tubular configuration with a slot therein; and the lower portion of the outer surface of the bottom end cap having pin hole there through, with the pin hole being orthogonal to the slot.

4. The hydraulic cylinder bottom end cap as described in claim 3, with the bottom end cap lower portion further comprising the sweep O ring groove having a third width and a third depth, the third width of the sweep O ring groove being less than the first upper O ring groove and the second lower O ring groove, the third width of the sweep O ring groove being greater than the second width of the snap ring groove, the third depth of the sweep O ring groove being less than the first depth of the first upper O ring groove and the second lower O ring groove.

5. The hydraulic cylinder bottom end cap as described in claim 4, with the bottom end cap further comprising:

the upper extent of the outer surface having a first flat circular ring configuration;

the lower extent of the outer surface having a second flat circular ring configuration;

the snap ring groove of the outer surface being located between the second lower O ring groove and the third sweep O ring groove; and the lower extent of the outer surface having an outermost edge with a bevel therein.

6. The hydraulic cylinder bottom end cap as described in claim 5, with the bottom end cap further comprising the pressure line aperture being located between the first upper O ring groove and the second lower O ring groove.

7. The hydraulic cylinder bottom end cap as described in claim 6, with the bottom end cap further comprising:

the inner surface lower extent having a first step therein; and the inner surface upper extent of the upper portion having a second step with an outward bevel therein.

* * * * *